United States Patent [19]
Lewis et al.

[11] Patent Number: 5,677,978
[45] Date of Patent: Oct. 14, 1997

[54] BENT PROBE MICROSCOPY

[76] Inventors: Aaron Lewis, 38 Woodevest Ave., Ithaca, N.Y. 14850; Klony Lieberman, 82020 Beverly Rd., New Gardens, N.Y. 11415

[21] Appl. No.: 592,291

[22] PCT Filed: Aug. 5, 1994

[86] PCT No.: PCT/US94/08691

§ 371 Date: Feb. 2, 1996

§ 102(e) Date: Feb. 2, 1996

[87] PCT Pub. No.: WO95/05000

PCT Pub. Date: Feb. 16, 1995

[30] Foreign Application Priority Data

Aug. 8, 1993 [IL] Israel ......... 106613

[51] Int. Cl.⁶ ......... G02B 6/02
[52] U.S. Cl. ......... 385/147; 385/13; 385/43; 385/125
[58] Field of Search ......... 385/12, 13, 15, 385/31, 38, 39, 43, 123, 125, 133, 147

[56] References Cited

U.S. PATENT DOCUMENTS

| | | | |
|---|---|---|---|
| 4,917,462 | 4/1990 | Lewis et al. | 359/368 |
| 4,947,034 | 8/1990 | Wickramasinghe et al. | 250/216 |
| 5,105,305 | 4/1992 | Betzig et al. | 359/368 |
| 5,264,698 | 11/1993 | Kopelman et al. | 250/307 |
| 5,289,004 | 2/1994 | Okada et al. | 250/306 |
| 5,304,795 | 4/1994 | Fujihira et al. | 250/234 |
| 5,361,314 | 11/1994 | Kopelman et al. | 385/12 |
| 5,485,536 | 1/1996 | Islam | 385/31 |

FOREIGN PATENT DOCUMENTS

| | | |
|---|---|---|
| 0 535 611 | 4/1993 | European Pat. Off. |
| 0 545 538 | 6/1993 | European Pat. Off. |
| 0 622 652 | 11/1994 | European Pat. Off. |

OTHER PUBLICATIONS

"Functionalized SXM Tip", IBM Tech. Discl. Bul., vol. 35, No. 3, Aug. 1, 1992, pp. 150–152.

Shmuel Shalom et al., "A Micropipette Force Probe Suitable for Near–Field Scanning Optical Microscopy", Rev. of Sci. Inst., vol. 63, No. 9, Sep. 1, 1992, pp. 4061–4065.

Vaez–Iravani M. et al., "Correlative Imaging in Scanning Near–Optical Microscopy", J. of Vacuum Sci. and Tech., Part A, vol. II, No. 4, part 01, Jul. 1, 1993, pp. 742–746.

Kuck N. et al., "Visible Electroluminescent Subwavelength Point Source of Light", Appl. Phys. Lett., vol. 61, No. 2, Jul. 13, 1992, pp. 139–141.

Lieberman, K., Harush, S. Lewis, A. and Kopelman, R. "A Light Source Smaller Than the Optical Wavelength", Science, vol. 247, pp. 59–61 (Jan. 1989), American Association for the Advancement of Science.

Okazaki, S., et al., "Development of High–Resolution Optical Scanning Fluorescence Microscopy" Mikrochim. Acta [Wien] III, 87–95 (1988), Springer–Verlag [No Month].

Fischer, U. Ch. "Optical characteristics" J. Vac. Sci. Technol. B, vol. 3 No. 1, 386–389, (Jan./Feb. 1985), American Vacuum Society.

Dürig, U., Pohl, D. W., and Rohner, F. "Near–field optical–scanning microscopy" J. Appl. Phys. vol. 59, No. 10, 3318–3327 (May 1986), American Institute of Physics.

Reddick, R. C., Warmack, R. J., Ferrell, T. L. "New form of scanning optical microscopy" Physical Review B, vol. 39, No. 1, 767–770 (Jan. 1989), The american Physical Society.

Harootunian, A., Betzig, E., Isaacson, M., and Lewis, A. "Super–resolution fluorescence near–field scanning optical microscopy" Appl. Phys. Lett., vol. 49, No. 11, 674–676 (Sep. 1986), American Institute of Physics.

*Primary Examiner*—John D. Lee
*Attorney, Agent, or Firm*—Jones, Tullar & Cooper, P.C.

[57] ABSTRACT

A general purpose force sensor for measuring nanometer scale surface topography and other characteristics includes a hollow micropipette having an inner diameter of about 7.5 nanometers at its tip. The probe includes a cantilevered structure obtained by heating it near the tip to bend it. A reflective coating is then applied to the outer surface of the micropipette.

10 Claims, 2 Drawing Sheets

Tip bends away from heat

BENT PROBE MICROSCOPY

FIELD OF THE INVENTION

The invention is a general purpose device for measuring nanometer scale surface characteristics. The device integrally consists of a very sensitive force sensor for measuring surface topography and forces. The structure of the device also allows for the simultaneous monitoring of a number of other surface characteristics. In addition, the device may also be used for modification and patterning with nanometer scale resolutions.

BACKGROUND OF THE INVENTION

Scanned probe technologies today rely on a microscopically small tip interacting with a surface as the tip is scanned in very close proximity to the surface.. The interaction between the tip and the sample can typically be used both to track the surface topography and/or measure other characteristics. The two most common interactions which are utilized are electron tunneling (scanning tunneling microscopy—STM) and force sensing (scanning force microscopy—SFM). Tunneling requires a conducting probe and a conducting sample and is thus restricted in its application. Force sensing removes this restriction. Force sensing requires a structure which is sensitive enough to detect the small forces (van der walls, columbic, etc.) that are present at an interface between a tip and a surface which are typically of piconewton magnitude. In addition the probe must be flexible enough so as not to deform the surface as it scans over it. This requires a force constant on the order of 1 Newton/meter.

One of the basic requirements of a probe for practical application of scanned force sensing is to have a sharp, finely tapered tip which can accurately track over and into surface corrugations. If the probe has a blunt or quickly tapered tip, scanning the tip at a constant height above the surface will not produce an accurate rendition of the topography but rather a convolution of the tip structure with the surface. This is particularly significant when force imaging is to be used for metrology applications. A great deal, of effort, using sophisticated electron beam deposition techniques, is currently expended in order to produce sharp enough tips for such applications [Basile M. J., et al. *Scanned probe tips formed by focussed ion beams*, Rev. sci. instrm. 62.2167 (1991); Kado H., Yokoyama K. and Tohda T. *A Novel ZnO Whisker Tip for Atomic Force Microscopy*, Ultramicroscopy (1992)].

The deflection of the probe induced by the interaction with the surface force is generally detected by optical means. For the detection of normal forces of the surface on the tip, the probe consists of a cantilever with a tip hanging off one end. The forces on this tip are typically measured by focusing a laser beam onto a small spot on the back side of the probe. When the probe bends the small angular deviation of the beam is detected with a position sensitive detector [D. Rugar and P. K. Hansma, Phys. Today, 43, 23 (1990); K. Wickramasinghe, Sci. Am. 26, 90 (1989)]. Alternatively, the motion of the probe and beam can be monitored interferometrically [D. Rugar and P. K. Hansma, Phys. Today 43, 23 (1990); K. Wickramasinghe, Sci. Am. 26, 90 (1989)]. Both techniques require for normal force sensing a small, flat reflecting surface on which to direct the beam. Alternately, lateral force sensing does not depend on a cantilevered structure.

STATE OF PRIOR ART

The first normal force cantilevers were fabricated by etching thin wires and mechanically bending them near the tip to produce a cantilevered structure [D. Rugar and P. K. Hansma, Phys. Today 43, 23 (1990); K. Wickramasinghe, Sci. Am. 26, 90 (1989)]. Such probes had a number of problems including control over etching and the difficulty in mechanically bending the tip in a reproducible fashion. In addition such probes are not well suited to optical deflection sensing since they contain no flat region which may be used to reflect a laser beam.

Force cantilevers in common use today are typically microfabricated with conventional microlithography techniques [D. Rugar and P. K. Hansma, Phys. Today 43, 23 (1990); K. Wickramasinghe, Sci. Am. 26, 90 (1989)]. Such probes consist of a thin silicon membrane or cantilever onto which a small sharp cone is produced [D. Rugar and P. K. Hansma, Phys. Today 43, 23 (1990); K. Wickramasinghe, Sci. Am. 26, 90 (1989)]. At the tip of the cone an additional filament is often grown to produce a sharper and finer tapered tip. The mechanical characteristics of such probes are determined by the materials used, tip mass and geometry. Typical force constants for such tips are in the 0.1 to 10 Newton/Meter range. These probes, however, are not very suitable for other forms of scanned probe microscopy.

SUMMARY OF THE INVENTION

The invention is a method and a device for producing a general purpose probe for all forms of scanned probe imaging and patterning. The structures produced with this method are immediately compatible with all the force deflection sensing techniques in use today.

The device is based on a glass or quartz micropipette or fiber which can be pulled down to a variety of dimensions at the tip with 10 nanometers the smallest outer diameter achieved thus far. The micropipettes remain hollow and can have an inner diameter at the tip of 7.5 nanometers. These probes may be pulled with a very gradual taper giving a cone angle at the tip of only a few degrees, or can be tapered with larger cone angles if the application so requires.

For lateral force sensing nothing further needs to be done. For the addition of normal force sensing the probe is then given a cantilevered structure by locally heating it near the tip and applying a small force to bend the tip when the glass or quartz becomes soft. This is shown schematically in FIG. 1. Localized heating is achieved by focusing a CO laser to a small spot near the tip. A stream of air is directed at the tip region while the heating is taking place. This serves two purposes. First, the air cools the tip so that there will not be excessive heat conduction in the glass which could melt the tip of the probe and second, the air flow provides sufficient force to bend the very tip as soon as the glass or quartz becomes sufficiently soft. The bend radius is determined principally by the size of the laser heating spot. Focusing a $CO_2$ laser down to a diffraction limited $10\mu$ spot can readily produce bends a few 10's of microns from the tip.

Once the cantilevered structure is obtained the crucial polishing step takes place to provide the incorporation of optical deflection sensing techniques. This is done by inserting the cantilevered structure into a micromanipulator and bringing the end of the bent region into contact with a rotating polishing surface as shown in FIG. 2. The polished region may be as small as several microns in diameter. This produces an optically flat surface from which a laser beam may be reflected to monitor the deflection of the cantilever. This polished region is just above the bent section of the tip for maximum deflection sensitivity.

After the tip is bent a reflecting metallic coating may be deposited on the polished section to enhance the reflectivity.

A metal coating may be further applied to the entire outer region of a micropipette probe and the walls of a fiber probe to produce a structure which may also be used as a near-field subwavelength point of light.

Such bent polished structures can simultaneously be used to pass light through the device to the tip which, as noted above, can be transformed into a near-field aperture by an appropriate metal coating. With bent fibers light is guided around the bend. With pipettes a high index liquid can be made to fill the pipette void and this also permits the transmission of light around the bend and through the near-field, sub-wavelength aperture at the tip. The resulting sub-wavelength point of light can be used for imaging and patterning while force is used, either normal or lateral, to monitor the topography and force characteristics of the surface. Furthermore, in such a structure the metallic coating at the tip can be used to measure simultaneously tunneling currents to determine the tunneling characteristics. With micropipettes these same structures can be readily filled with an optically or electrically excited light-emitting substance to produce a sub-wavelength source of light with many of the above sensing capabilities. The light emitting substance at the tip of the pipette can also be used to monitor specific ions or sense surface charge. Alternately, micropipette structures can be produced with a metal wire down the hollow interior extending to the tip. The coating of metal on the outside of this structure if it is generated using a different metal from that in the interior, permits the production of a thermal sensor with the force and tunneling characteristics noted above. Such a metal sandwiched glass structure with a transparent glass tip could also be used to propagate light without evanescent losses in the subwavelength region. This structure would be the optical analog to an electrical coaxial cable. As another alternative sol-gel conducting glass can also be deposited in the tip and this glass can be embedded with optically excited materials to produce a structure which could monitor optical, electrical and the conductive nature of surfaces. The essence of all these structures are the multichannel sensing capabilities which have been patently absent in scanned probe microscopes because no elements such as the ones noted here have been devised.

BRIEF DESCRIPTION OF THE DRAWINGS

The foregoing, and additional objects, features and advantages of the present invention will become apparent to those of skill in the art from the following detailed description of a preferred embodiment thereof, taken with the accompanying drawings, in which.

DETAILED DESCRIPTION

Figure 1:
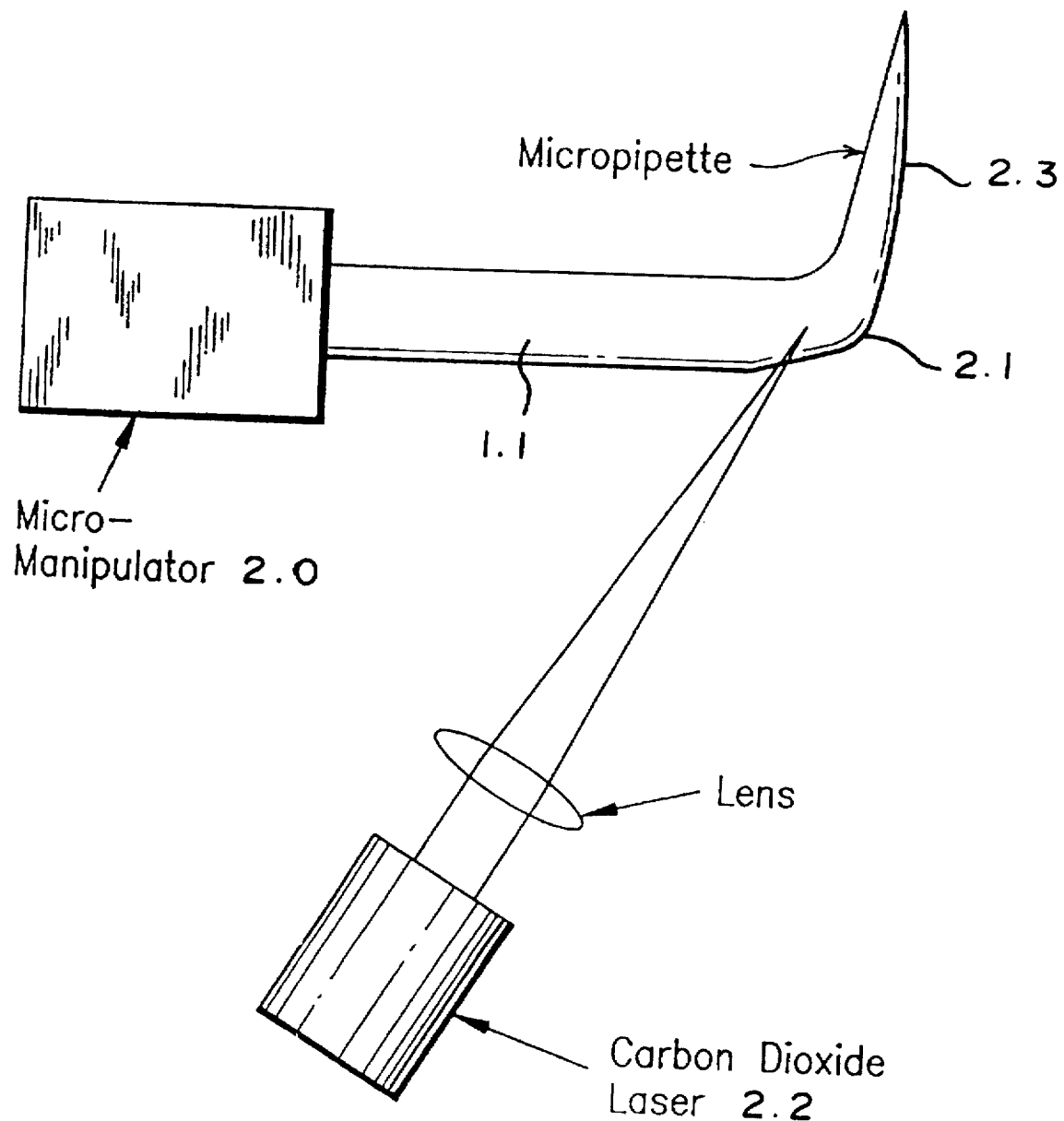
FIG. 1 is a diagrammatic illustration of apparatus for bending a micropipette.
Figure 2:
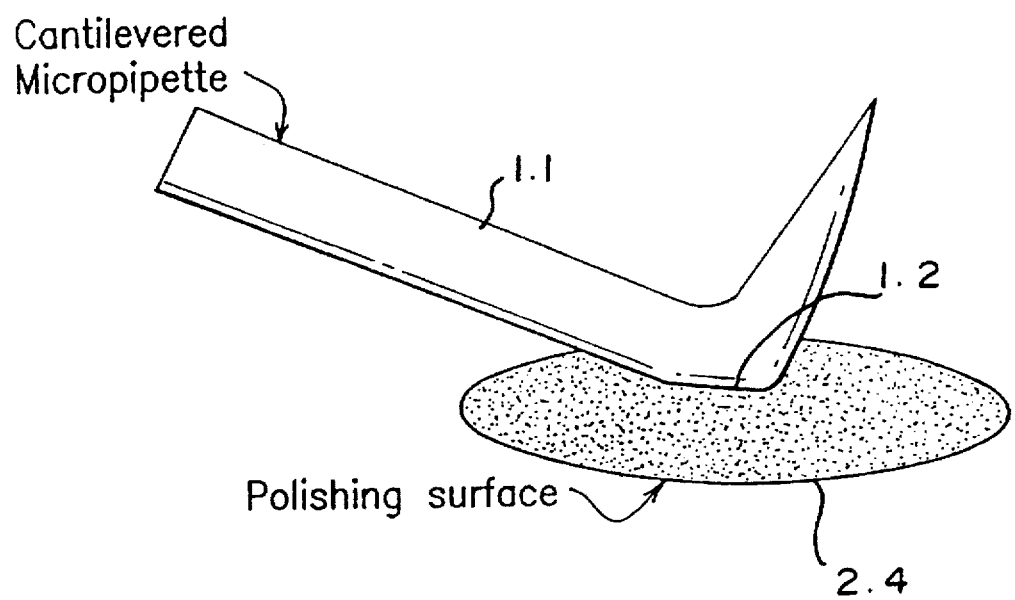
FIG. 2 illustrates apparatus for producing a beveled, polished surface on a bent micropipette.
Figure 3:
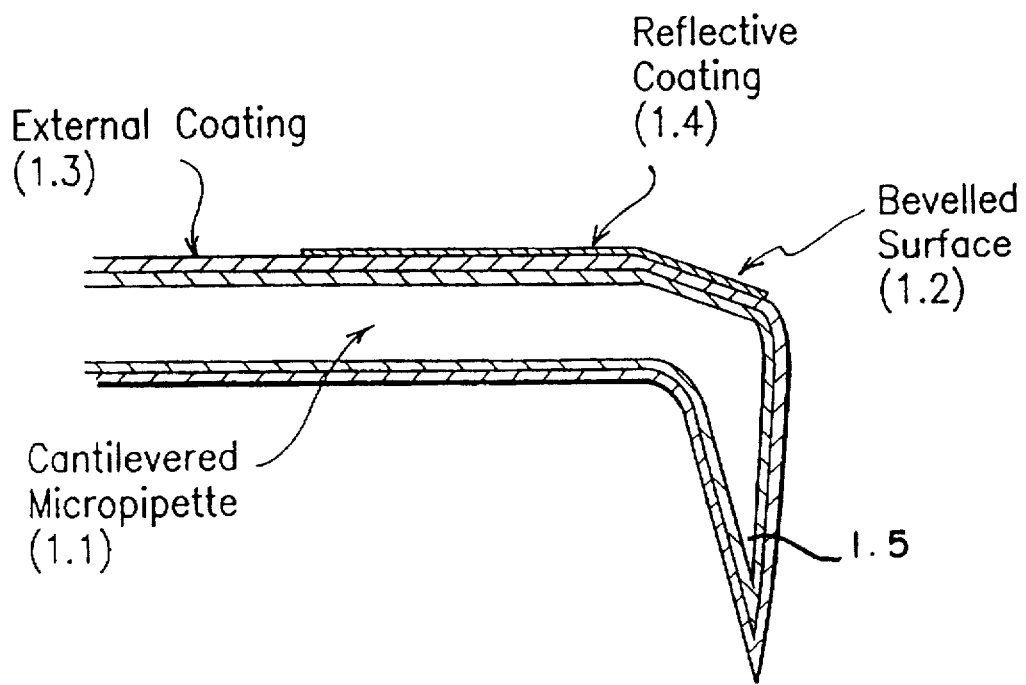
FIG. 3 is a cross-sectional view of a micropipette in accordance with the invention.

A cross-sectional view of a bent probe produced according to the present invention is shown in FIG. 3. It consists of a glass or quartz micropipette or a glass or quartz optical fiber 1.1. The micropipette is tapered to produce a hole at the tip that can be as small as 7.5 nm, while the glass or quartz optical fiber is tapered to produce a tip outer diameter that can be as small as 10 nanometers. The micropipette or fiber is secured in a micromanipulator 2.0 as illustrated in FIG. 1, and is bent, for normal force sensing, near the tip by heating it locally at region 2.1 with a laser 2.2 such as a carbon dioxide laser. A stream of air may be directed toward the tip region to cool it and to bend the tip portion 2.3 to produce a cantilevered bent probe structure. Thereafter, the bent micropipette or fiber 1.1 is polished just above the bend, as illustrated in FIG. 2, by a polishing surface 2.4 to produce an optically flat bevelled surface 1.2.

A material 1.3 such as aluminum or gold is optionally deposited along the outer surface of the probe to provide for an opaque coating if required.

A reflective coating 1.4 such as aluminum is deposited on the beveled, polished surface of part 1.1 to provide a reflecting surface.

A material 1.5 is optionally inserted into the very tip of the micropipette probe which acts as a specific chemical, optical or thermal sensor for various local phenomenon.

The bent probe is incorporated into a micropositioning instrument, and can be inserted with micropositioner under the lens of a regular microscope which can be used together with an interferometric measurement through this lens to sense the deflection the micropipette cantilever with the lens also being used for collection of light from the sample and illumination of the sample.

In operation, the probe is brought into the near field of the surface by either monitoring lateral force in a non-bent structure or by monitoring the deflection of the cantilever in a bent structure by normal force impinging on the tip of the bent pipette or fiber. Then the structure is scanned along the surface either in contact or in near-contact by monitoring surface forces while the other attributes of the tip are used to monitor simultaneously the chemical, optical, electrical or thermal characteristics of the surface.

The probes produced with the technique described here have a number of advantages over presently available scanned force probes. First, the initial pulling technique allows for simply and accurately controlling and adjusting the force characteristics and constants of the probe itself. Second, the pulling process naturally produces very sharp and finely tapered tips which are required for accurate force imaging. Conventionally produced tips require a complex and poorly understood growth of a fine filament, with the aid of electron beam deposition techniques, at the tip of the microfabricated cone as an additional step after the sensor is completed. Finally the micropipette and fiber probes allow numerous other surface characteristics to be monitored simultaneously with force sensing. This includes near-field optical interactions and, in the case of the micropipette probe a variety of specific sensors, may be placed within the tip.

We claim:

1. A probe, comprising:
    a tapered micropipette having a hollow tip drawn to an inner tip diameter of 10 nanometers or less, said micropipette having a bend near said tip and mounted to produce a cantilevered bent probe structure suitable for normal force sensing; and
    an optically flat polished region near said, bend for monitoring deflection of the cantilevered structure.

2. The probe of claim 1, wherein said micropipette includes an outer wall surface coating to produce a probe suitable for near-field scanning optical microscopy and lithography.

3. The probe of claim 2, further including a material inserted in said hollow tip to act as a specific chemical, spectroscopic, surface charge, or other sensor of a local environment at said tip.

4. The probe of claim 3, wherein said material in said hollow tip and said outer surface coating are different metals selected to produce a highly localized thermocouple at said tip.

5. The probe of claim 1, further including:
a micromanipulator for mounting said bent probe under the lens of a microscope for interferometric measurement through the lens to sense the deflection of the bent probe by motion of said flat polished region while using the lens for illumination of a sample and collection of light from the sample.

6. A probe, comprising:
a tapered optical fiber having a tip drawn to an outer tip diameter of 10 nanometers or less, said fiber having a bend near said tip and mounted to produce a cantilevered bent probe structure suitable for force sensing; and
an optically flat polished region near said bend for monitoring deflection of the cantilevered structure.

7. The probe of claim 6, including:
a micromanipulator for mounting said bent probe under the lens of a microscope for interferometric measurement through the lens to sense the deflection of the bent probe by motion of said flat polished region while using the lens for illumination of a sample and collection of light from the sample.

8. A method for producing ultrafine cantilevered glass or quartz micropipette or optical fiber probes with force sensing characteristics, comprising:
drawing a micropipette or fiber to produce a tip having a tapered end portion having a minimum dimension of 10 nm or less;
heating the tip at a location a few tens of microns from the tapered end portion by heating; and
bending the tip at the heated location.

9. The method of claim 8, further including polishing said tip at a surface location near the location of bending to produce an optically flat polished region for monitoring deflection of the tip.

10. A method for producing an optically flat reflecting surface on a cantilevered micropipette or fiber bent probe, comprising:
holding a bent probe in a micromanipulator; and
polishing the outer surface of the bent probe using a polishing wheel to provide a reflecting surface to allow monitoring of probe deflection using optical deflection sensing technology.

* * * * *